United States Patent
Grayson et al.

(10) Patent No.: US 10,880,862 B2
(45) Date of Patent: Dec. 29, 2020

(54) PAGING FOR CONVERGED ENTERPRISE PRIVATE RADIO SERVICE AND WI-FI ACCESS DEPLOYMENTS

(71) Applicant: Cisco Technology, Inc., San Jose, CA (US)

(72) Inventors: Mark Grayson, Maidenhead (GB); Vimal Srivastava, Bangalore (IN); Srinath Gundavelli, San Jose, CA (US); Shree Murthy, San Jose, CA (US); Sonal Chhabria, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/393,608

(22) Filed: Apr. 24, 2019

(65) Prior Publication Data

US 2020/0344717 A1   Oct. 29, 2020

(51) Int. Cl.
*H04W 68/00* (2009.01)
*H04W 84/12* (2009.01)
*H04W 88/08* (2009.01)
*H04W 88/02* (2009.01)

(52) U.S. Cl.
CPC .......... *H04W 68/005* (2013.01); *H04W 84/12* (2013.01); *H04W 88/02* (2013.01); *H04W 88/08* (2013.01)

(58) Field of Classification Search
CPC ... H04W 52/28; H04W 68/00; H04W 68/005; H04W 68/02; H04W 68/027; H04W 84/12; H04W 88/02; H04W 88/08; H04L 29/08594
See application file for complete search history.

(56) References Cited

U.S. PATENT DOCUMENTS

| | | | | |
|---|---|---|---|---|
| 9,480,046 B1* | 10/2016 | Mehta | | H04W 68/04 |
| 2002/0086685 A1* | 7/2002 | Wallentin | | H04W 68/00 |
| | | | | 455/458 |
| 2009/0197592 A1* | 8/2009 | Schmitt | | H04W 68/00 |
| | | | | 455/426.1 |
| 2009/0316629 A1* | 12/2009 | Singh | | H04W 68/00 |
| | | | | 370/328 |
| 2013/0039339 A1* | 2/2013 | Rayavarapu | | H04W 76/19 |
| | | | | 370/331 |
| 2013/0279508 A1* | 10/2013 | Kano | | H04L 45/742 |
| | | | | 370/392 |
| 2014/0120911 A1* | 5/2014 | Kozuka | | H04W 68/04 |
| | | | | 455/435.1 |
| 2014/0302874 A1* | 10/2014 | Zakrzewski | | H04W 76/10 |
| | | | | 455/456.1 |
| 2018/0332660 A1* | 11/2018 | Mueck | | H04W 48/10 |
| 2019/0082490 A1* | 3/2019 | Zhang | | H04W 48/16 |

(Continued)

*Primary Examiner* — Warner Wong
(74) *Attorney, Agent, or Firm* — Merchant & Gould P.C.

(57) ABSTRACT

Paging for converged enterprise private Long-term Evolution (LTE) radio service and Wi-Fi access deployments may be provided. First, a notification in response to a User Equipment (UE) device being determined to be in an idle state may be received at a Wireless Local Area Network (WLAN) controller. A Citizens Broadband Radio Service (CBRS) Access Point (AP) to page in order to place the UE in a connected state may then be determined. Next, a paging request may be sent to the determined CBRS AP.

13 Claims, 5 Drawing Sheets

(56) References Cited

U.S. PATENT DOCUMENTS

| | | | | |
|---|---|---|---|---|
| 2019/0268943 A1* | 8/2019 | Su | .................. | H04W 48/14 |
| 2019/0289570 A1* | 9/2019 | Kim | .................. | H04W 68/005 |
| 2019/0305903 A1* | 10/2019 | Badic | .................. | H04W 64/003 |
| 2020/0092842 A1* | 3/2020 | Kim | .................. | H04W 76/27 |
| 2020/0100207 A1* | 3/2020 | Liu | .................. | H04W 68/005 |

* cited by examiner

FIG. 5

PAGING FOR CONVERGED ENTERPRISE PRIVATE RADIO SERVICE AND WI-FI ACCESS DEPLOYMENTS

TECHNICAL FIELD

The present disclosure generally relates to interworking between private Long Term Evolution (LTE) service and wireless network access architectures.

BACKGROUND

The Federal Communications Commission (FCC) created the Citizens Broadband Radio Service (CBRS), allocating radio spectrum in the 3550-3700 MHz band (e.g., 3.5 GHz band) for shared wireless broadband use by enterprises under certain sharing regulations. Enterprises can use this CBRS spectrum to set up private Long-term Evolution (LTE) networks and allow access to consumer and Internet of Things (IoT) devices. Enterprises may expand and increase the coverage density of private LTE networks by integrating CBRS into their wireless connectivity services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Paging for converged enterprise private Long-term Evolution (LTE) radio service and Wi-Fi access deployments may be provided. First, a notification in response to a User Equipment (UE) device being determined to be in an idle state may be received at a Wireless Local Area Network (WLAN) controller. A Citizens Broadband Radio Service (CBRS) Access Point (AP) to page in order to place the UE in a connected state may then be determined. Next, a paging request may be sent to the determined CBRS AP.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Enterprises may have the option to expand and increase wireless coverage density by integrating Citizens Broadband Radio Service (CBRS) (e.g., Private LTE Radio Service) into its enterprise wireless networks (e.g., Wi-Fi based wireless connectivity services). There may be two approaches for integrating CBRS into enterprise wireless networks. One approach may comprise using Evolved Packet Core (EPC) functions deployed in a Cloud or on premises to manage the CBRS Access Points (APs) and User Equipment (UE). This may be a ships-in-the-night approach, with two parallel service layers for managing Wi-Fi and CBRS devices, and network elements. The other approach may be a converged approach where the CBRS service layer may be terminated into a common session management layer for managing both Wi-Fi and CBRS sessions, and additionally with a converged CBRS and Wi-Fi with a common Radio Resource Management function. Embodiments of the disclosure may comprise the later with a unified CBRS and Wi-Fi service layer.

Embodiments of the disclosure may include paging support for CBRS devices. Paging may comprise a process in an LTE network where the network may "wake-up" a UE device (which may have previously gone into an idle state) when there is some downlink data to be delivered to the UE device. When the network needs to send a downlink packet to the UE device, it may first page the UE device so that it may establish a connection with the network. A Mobility Management Entity (MME) may be responsible for the initiation of the LTE paging procedure and perform this by forwarding a paging message to one or more eNBs. The location of a UE device in an idle state may be known to the MME on a per tracking area basis. The MME may forward the paging message to all the eNB within the relevant tracking area. On receiving the paging request, the UE device may establish a radio connection with the eNB and S1-App, and S1-U connection with the MME and Serving Gateway (SGW) may be established.

With conventional converged architectures, network side functions may support minimum interfaces/features on the CBRS access, keeping parity with the Wi-Fi services. Paging and other related semantics, such as tracking may be missing in the Wi-Fi architecture because a Wi-Fi device may attempt to remain associated to an AP. Accordingly, embodiments of the disclosure may leverage a Wi-Fi association states of a UE to provide paging.

Long Term Evolution (LTE) services in the 3.5 GHz band may work both indoors and outdoors and may be a premium wireless resource for enterprise applications. Radio signals in the 3.5 GHz spectrum may have limited propagation characteristics that may be compatible with indoor environments. Floor-by-floor deployment options may coexist with Wi-Fi access networks.

Rules and regulations relating to CBRS band usage may make CBRS available for devices that use a LTE Media Access Control (MAC) layer operating in the 3.5 GHz band. Devices that use a Wi-Fi MAC layer operating in other frequency bands, such as the 2.4 GHz, 3.6 GHz, 4.9 GHz, 5 GHz, or 5.9 GHz frequency bands, may not be able to operate in the CBRS band. An enterprise deploying a CBRS-based private LTE network may be required to host and/or manage (e.g., all of) the complex 3rd Generation Partnership Project (3GPP) radio/core network functions, including, but not limited to, the Policy And Charging Rules Function (PCRF), the Mobility Management Entity (MME), the Packet Data Network Gateway (PGW), Serving Gateway (SGW), Access and Mobility Function (AMF), Session Management Function (SMF), Policy Control Function (PCF), and/or other 4G or 5G functions. Alternatively, an enterprise may engage a service provider to host the radio and the LTE service layer. These options may be expensive. Enterprise wireless service infrastructure may not be reused, and it may be difficult or impossible to realize a unified policy control.

In some embodiments, devices operating in a private LTE network, e.g., CBRS devices, may be integrated into a Wi-Fi service layer without the need for an LTE core network. As used in this disclosure, "CBRS device" or "CBRS UE device" may refer to a device that may operate in a private LTE network, which may be a CBRS network. CBRS devices may include, but are not limited to, User Equipment (UE) devices and/or Access Point (AP) devices. Functions in the enterprise network may provide Wi-Fi-type services and a unified policy control to CBRS UE devices.

The LTE MAC layer may be used. A CBRS UE device and a CBRS AP may use an air interface. A CBRS-Wi-Fi interworking and proxy function may implement a mapping function. The mapping function may translate LTE service semantics to Wi-Fi service semantics. The interworking and proxy function may be implemented in the CBRS access point. The interworking and proxy function may be implemented in the Wireless Local Area Network (WLAN) controller.

A CBRS UE device may operate as an LTE device. The functions that are providing the services may be the same functions that provide services to the Wi-Fi devices in the enterprise network. For example, services such as network discovery, access authentication, PDN establishment/IP address configuration and quality of service (QoS) that may be supported in the LTE network, may be translated and terminated on Wi-Fi functions.

In some embodiments, an interworking function may interwork with a UE device. The interworking function may interwork with a CBRS AP. The interworking function may interwork with the Wi-Fi control plane functions. The interworking function may normalize the session semantics between LTE and Wi-Fi access systems. Wi-Fi and CBRS devices may be unified into a single service layer.

Some network-initiated features may be masked. For example, network-initiated bearer Quality of Service (QoS), emergency services, and other network-initiated features may be masked. A reduced feature set and reduced semantics may be used to maintain feature parity of a CBRS-based LTE session with a Wi-Fi session. Basic network discovery, access authentication, PDN establishment/IP address configuration, and/or default bearer setup may be supported.

In some embodiments, a UE device may have awareness of the service layer. Non-access Stratum (NAS) and Internet Protocol (IP) signaling may align with Wi-Fi service semantics. There may be optimizations in the authentication mode. Wi-Fi access authentication of a UE device may be bootstrapped for CBRS/LTE access authentication.

Figure 1:
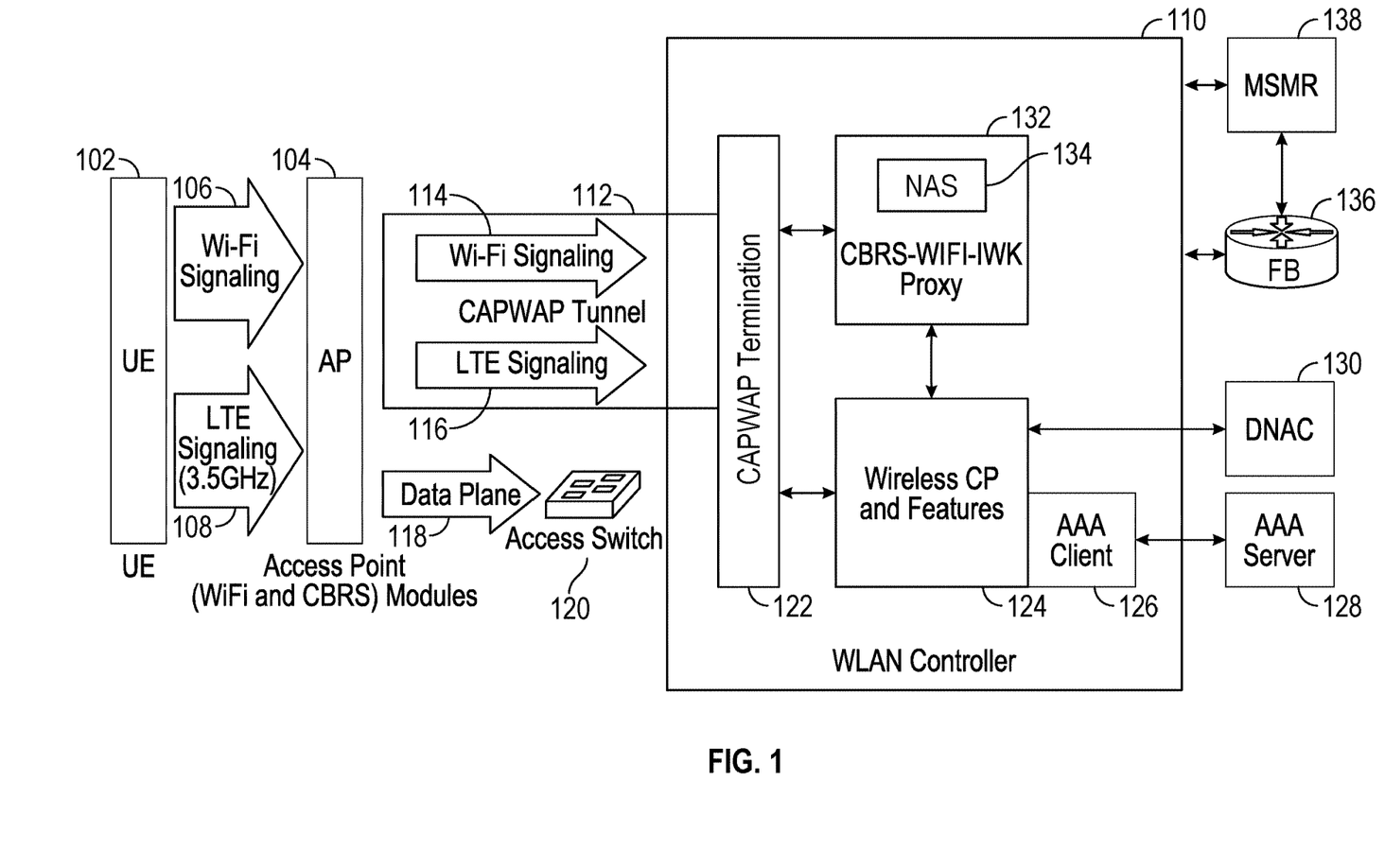
FIG. 1 shows a system for providing an interworking between a private Long-term Evolution (LTE) (e.g., Citizens Broadband Radio Service (CBRS)) user equipment (UE) device and a Wi-Fi access network.

FIG. 1 illustrates an example system 100 that may provide interworking between a private LTE (e.g., CBRS) UE device and a Wi-Fi access network. A UE device 102 may communicate with an AP device 104 using an air interface. The air interface may communicate a variety of signals, including, but not limited to, Wi-Fi signals 106 or LTE signals 108. These signals may occupy different frequency bands. For example, Wi-Fi signals 106 may be transmitted in one or more of the 2.4 GHz, 3.6 GHz, 4.9 GHz, 5 GHz, or 5.9 GHz frequency bands. LTE signals 108 may be transmitted in the 3.5 GHz frequency band. UE device 102 may have an enterprise profile configured in it. The enterprise profile may enable UE device 102 to discover the enterprise CBRS network.

UE device 102 may be associated with a Public Land Mobile Network (PLMN). A PLMN may be uniquely identified by a PLMN identifier (PLMN ID). A PLMN ID may include a mobile country code (MCC) and a mobile network code (MNC). UE device 102 may be associated (e.g., configured) with a private enterprise PLMN ID with a plurality of different authentication modes as supported in 3GPP TS 33.501. UE device 102 may perform PLMN selection and may attach to an enterprise private LTE (e.g., CBRS) access point, such as AP device 104, using the 3.5 GHz frequency band.

FIG. 1 illustrates UE device 102 having Wi-Fi and private LTE sessions terminated on a single AP device 104 having Wi-Fi and private LTE radios. The Wi-Fi session and the private LTE session may be terminated on different AP devices.

UE device 102 may obtain an IP configuration. An address configuration mode, such as an IPv6 SLAAC/DHCPv6-based address configuration mode, may be enabled to enable UE device 102 to obtain the enterprise IP configuration.

AP device 104 may communicate with a Wireless Local Area Network (WLAN) controller 110 via a control and provisioning of wireless access protocols (CAPWAP) tunnel 112. AP device 104 may search for WLAN controller 110 by sending a discovery request message. When WLAN controller 110 receives the discovery request message, it may reply with a discovery response message. AP device 104 and WLAN controller 110 may establish a secure connection, e.g., using the Datagram Transport Layer Security (DTLS) protocol to exchange CAPWAP control and data messages. Control messages may include information and instructions related to WLAN management. Data messages may encapsulate forwarded wireless frames. Control and data messages may be sent over different User Datagram Protocol (UDP) ports. CAPWAP tunnel 112 may carry Wi-Fi signaling 114 and/or LTE signaling 116. AP device 104 may also communicate via a data plane 118 with an access switch 120.

CAPWAP tunnel 112 may communicate with a CAPWAP termination 122 that may reside in WLAN controller 110. CAPWAP termination 122 may communicate with a wireless control plane (CP) and features module 124.

WLAN controller 110 may communicate via an authentication, authorization, and accounting (AAA) client module 126 with an AAA server module 128, for example, for authentication and key generation. Wireless CP and features module 124 may use authentication, authorization, and/or accounting functions to control access to services. AAA client module 126 may exchange information, such as user credentials, keys, tokens, authorizations, etc. with AAA server module 128.

Wireless CP and features module 124 may communicate with a software-defined networking (SDN) system 130. SDN system 130 may be implemented, for example, as a Cisco digital network architecture controller (DNAC).

AP device 104 may communicate with a CBRS-Wi-Fi interworking and proxy module 132. For example, AP device 104 may use CAPWAP tunnel 112 and CAPWAP termination 122 for sending control plane and/or user plane data to the CBRS-Wi-Fi interworking and proxy module 132. AP device 104 may use CAPWAP and/or virtual extensible LAN (VXLAN) tunneling modes.

CBRS-Wi-Fi interworking and proxy module 132 may interwork with UE device 102 and with the AP device 104. CBRS-Wi-Fi interworking and proxy module 132 may interwork with Wi-Fi control plane functions.

CBRS-Wi-Fi interworking and proxy module 132 may terminate the LTE signaling. CBRS-Wi-Fi interworking and proxy module 132 may normalize the LTE signaling for a Wi-Fi service layer. CBRS-Wi-Fi interworking and proxy module 132 may receive and decode LTE signaling and may send an appropriate response, e.g., using Wi-Fi semantics, to wireless CP and features module 124.

CBRS-Wi-Fi interworking and proxy module 132 may provide non-access stratum (NAS) and/or S1 application protocol (S1 AP) functionalities to UE device 102. CBRS-Wi-Fi interworking and proxy module may provide Wi-Fi services and policy control. CBRS-Wi-Fi interworking and proxy module 132 may provide network discovery and/or address allocation functionality.

CBRS-Wi-Fi interworking and proxy module 132 may have a NAS module 134 that may decode NAS signaling. NAS module 134 may communicate with WLAN controller 110 to perform subscriber authentication and authorization, e.g., via AAA client module 126 and the AAA server module 128. For example, NAS module 134 may provide keys that may be in turn sent to UE device 102 and/or AP device 104. The keys may be used for NAS security, e.g., encryption and/or integrity, and/or security. NAS module 134 may communicate with WLAN controller 110 for Packet Data Network (PDN) management. Data packets destine to UE device 102 may be received at Fabric Border (FB) node 136. FB node 136 may comprise, but is not limited to, a router or a switch. MSMR server 138 may include a data base. MSMR server 138 may implement Locator/ID Separation Protocol (LISP) to provide semantics for IP addressing.

WLAN controller 110 and other elements described above of system 100 may be practiced in hardware and/or in software (including firmware, resident software, microcode, etc.) or in any other circuits or systems. WLAN controller 110 and other elements of system 100 may be practiced in electrical circuits comprising discrete electronic elements, packaged or integrated electronic chips containing logic gates, a circuit utilizing a microprocessor, or on a single chip containing electronic elements or microprocessors. Furthermore, WLAN controller 110 and other elements of system 100 may also be practiced using other technologies capable of performing logical operations such as, for example, AND, OR, and NOT, including but not limited to, mechanical, optical, fluidic, and quantum technologies. As described in greater detail below with respect to FIG. 5, WLAN controller 110 and other elements of system 100 may be practiced in a computing device 500.

Figure 2:
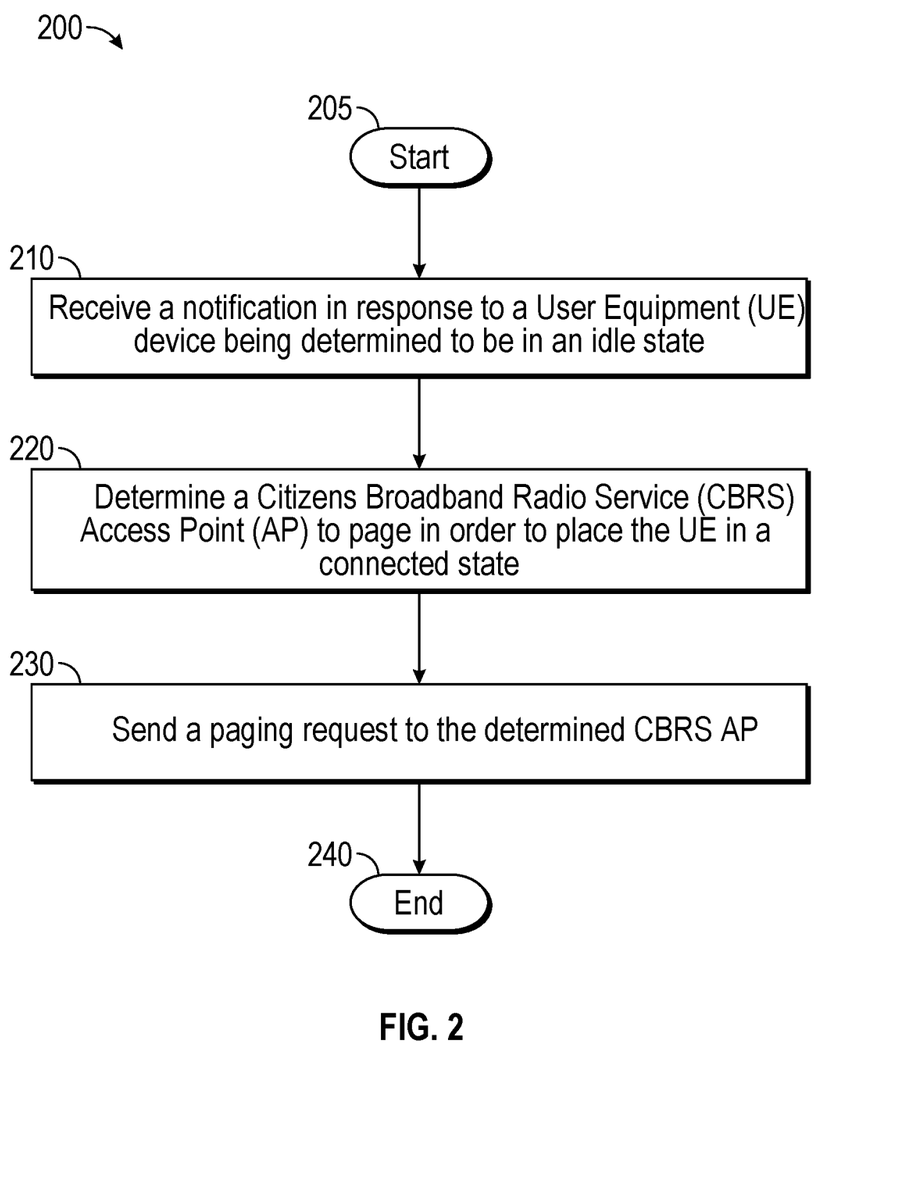
FIG. 2 is a flow chart of a method for providing paging for converged enterprise private LTE radio service and Wi-Fi access deployments.
Figure 3:
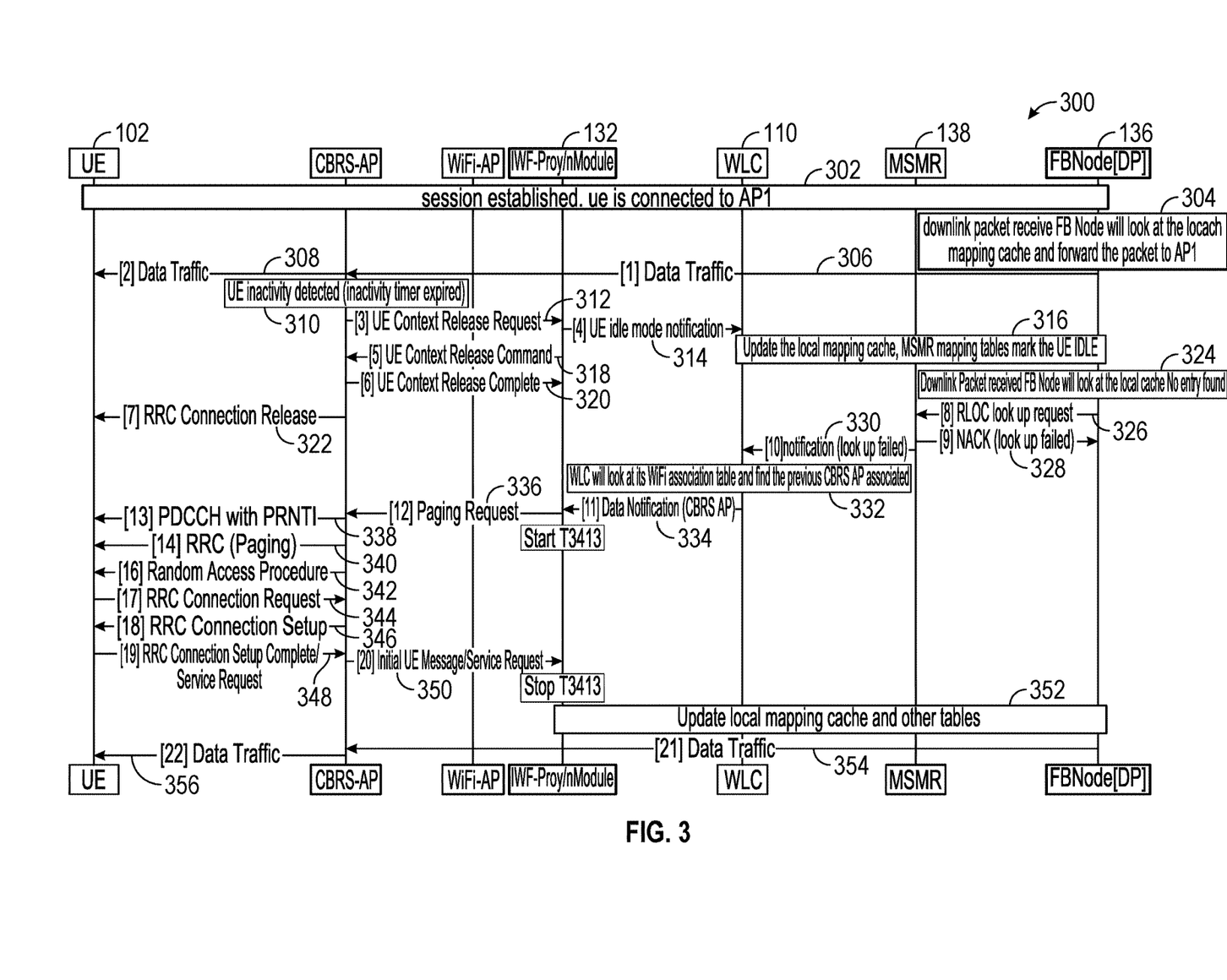
FIG. 3 is a process diagram of a method for providing CBRS when Wi-Fi association is available.
Figure 4:
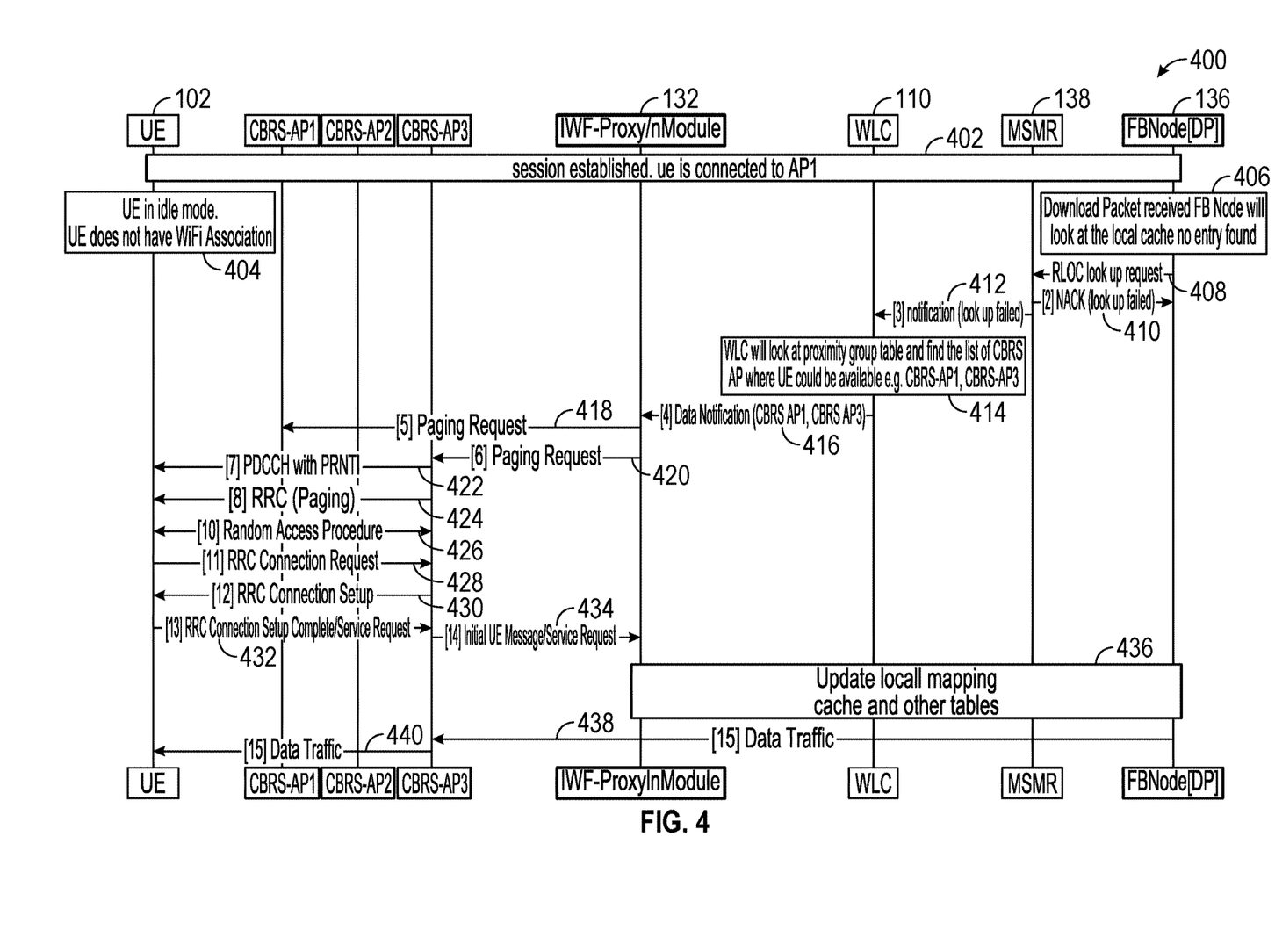
FIG. 4 is a process diagram of a method for providing CBRS when Wi-Fi association is not available.

FIG. 2 is a flow chart setting forth the general stages involved in a method 200 consistent with embodiments of the disclosure for providing paging for converged enterprise private LTE radio service and Wi-Fi access deployments. Method 200 may be implemented using WLAN controller 110 as described in more detail above with respect to FIG. 1. Method 200 will be described in conjunction with a process diagram 300 of a method for providing CBRS when Wi-Fi association is available as shown in FIG. 3 and in conjunction with a process diagram 400 of a method for providing CBRS when Wi-Fi association is not available as shown in FIG. 4. Ways to implement the stages of method 200 will be described in greater detail below.

During a period of inactivity (i.e., on inactivity timer expiration) the CBRS AP may request CBRS-Wi-Fi interworking and proxy module 132 to release UE device 102 by sending a UE context release request message. On receiving the UE context release request message from the CBRS AP, CBRS-Wi-Fi interworking and proxy module 132 may update MSMR server 138 to put UE device 102 in the idle state. MSMR server 138 may delete a cache entry for UE device 102 at all border nodes and switches including, for example, FB node 136.

A downlink packet may be received at FB node 136. FB node 136 may look at a local mapping cache (stage 304) and forward the packet to an AP (stage 306), which forwards to the packet a UE (e.g., UE device 102). (Stage 308). The AP may then detect that UE device 102 is inactive (stage 310) and may send a release request to CBRS-Wi-Fi interworking and proxy module 132. (Stage 312). CBRS-Wi-Fi interworking and proxy module 132 may then send a UE idle mode notification to WLAN controller 110 (stage 314), which may trigger an update to a local mapping cache in FB node 136 and may trigger updates to the MSMR mapping tables in MSMR server 138 to mark UE device 102 as idle. (Stage 316). CBRS-Wi-Fi interworking and proxy module 132 may issue a UE context release command to the AP (stage 318), which may send back a UE context release complete message. (Stage 320). The AP may then release UE device 102. (Stage 322). UE may now be in the idle state.

Method 200 may begin at starting block 205 and proceed to stage 210 where WLAN controller 110 may receive a notification in response to UE device 102 being determined to be in an idle state. For example, when data traffic destined to UE device 102 is seen by FB node 136, FB node 136 may perform a look up in the local mapping cache. As described above, because UE device 102 may be in an idle state, a reference to UE device 102 in the local mapping cache has been deleted. (Stage 324 and Stage 406). Because UE device 102 does not have an entry in the local mapping cache, FB node 136 may query MSMR server 138 for a Routing Locator (RLOC) of UE device 102's Endpoint Identifier (EID). (Stage 326 and Stage 408). MSMR server 138 may have the idle state marked for UE device 102's EID and may response with a NACK to FB node 136. (Stage 328 Stage 410). MSMR server 138 may also send a notification to WLAN controller 110 to send a trigger to CBRS-Wi-Fi interworking and proxy module 132 to start paging UE device 102. (Stage 330 Stage 412). MSMR server 138 may also directly notify CBRS-Wi-Fi interworking and proxy module 132 to start paging UE device 102. Accordingly, WLAN controller 110 may receive the notification in response to UE device 102 being determined to be in the idle state.

From stage 210, where WLAN controller 110 receives the notification in response to UE device 102 being determined to be in an idle state, method 200 may advance to stage 220 where WLAN controller 110 may determine a CBRS AP to page in order to place UE device 102 in a connected state. For example, as illustrated in FIG. 3, WLAN controller 110 may have information about a previous CBRS AP association of UE device 102 and also a current Wi-Fi AP association of UE device 102. Based on this, WLAN controller 110 may notify CBRS-Wi-Fi interworking and proxy module 132 to page UE device 102 along with previous CBRS AP.

(Stage 334). For example, WLAN controller 110 may cause CBRS-Wi-Fi interworking and proxy module 132 to page UE device 102 on a CBRS AP that is: i) co-located with the Wi-Fi AP that UE device 102 is currently associated with; or ii) close in proximity to the Wi-Fi AP that UE device 102 is currently associated with. WLAN controller 110 may cause CBRS-Wi-Fi interworking and proxy module 132 to page UE device 102 on a CBRS AP that UE device 102 was last associated with.

As illustrated in FIG. 4, WLAN controller 110 may not have information about a current Wi-Fi AP association of UE device 102. Because there may be no current Wi-Fi association information for UE device 102, WLAN controller 110 may not have any previously used CBRS AP details. However, WLAN controller 110 may maintain proximity group information for a list of CBRS AP that can be searched based on a last know Wi-Fi AP that UE device 102 was associated with. From this proximity information, WLAN controller 110 may perform a lookup based on the last know Wi-Fi AP and get a list of CBRS AP that may work. (Stage 414). Even though there may be no Wi-Fi Association, if there was any UE probe data sent towards an AP, it may be used by WLAN controller 110 to update the proximity group information that may be used to look up a CBRS AP.

Once WLAN controller 110 determines the CBRS AP to page in order to place UE device 102 in a connected state in stage 220, method 200 may continue to stage 230 where WLAN controller 110 may send a paging request to the determined CBRS AP. For example, as illustrated in FIG. 3, when WLAN controller 110 has information about a current Wi-Fi AP association of UE device 102, WLAN controller 110 may cause CBRS-Wi-Fi interworking and proxy module 132 to send a paging request to the determined the CBRS AP. (Stage 336). As illustrated in FIG. 4, when WLAN controller 110 does not have information about a current Wi-Fi AP association of UE device 102, WLAN controller 110 may cause CBRS-Wi-Fi interworking and proxy module 132 to send a paging request to respective ones of the determined plurality of CBRS APs until a service request message is respectively received in response. (Stage 418 and 420).

The CBRS AP may send a paging message to UE device 102. (Stage 338 and 340 of FIG. 3 or stage 422 and 424 of FIG. 4). On receiving the paging message, UE device 102 may initiated a service request procedure and establish a connection with the CBRS AP and network. (Stages 342, 344, 346, and 348 of FIG. 3 or stages 426, 428, 430, and 432 of FIG. 4). Now downlink data can be sent to UE device 102 because it is in the connected state.

Once UE device 102 is in the connected state, WLAN controller 110 may learn about UE device 102's RLOC, and MSMR server 138 and the local mapping cache on FB node 136 may be updated. (Stage 352 of FIG. 3 and stage 436 of FIG. 4). The next time the data traffic is received for UE device 102 by FB node 136, FB node 136 may again query MSMR server 138 for the RLOC of UE device 102's EID. MSMR server 138 may respond with UE device 102's RLOC information and this time traffic may be forwarded to UE device 102 from FB node 136. (Stages 354 and 356 of FIG. 3 and stages 438 and 440 of FIG. 4). After WLAN controller 110 sends the paging request to the determined CBRS AP in stage 230, method 200 may then end at stage 240.

Figure 5:
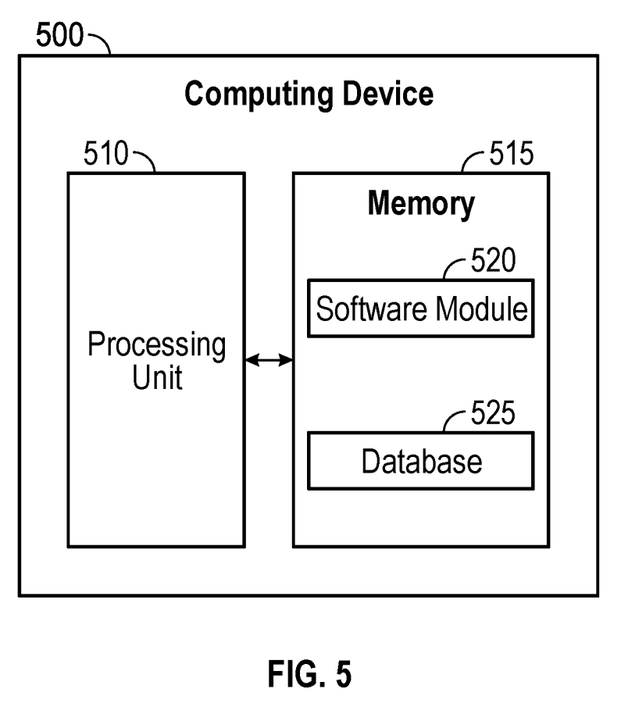
FIG. 5 shows a computing device.

FIG. 5 shows a computing device 500. As shown in FIG. 5, computing device 500 may include a processing unit 510 and a memory unit 515. Memory unit 515 may include a software module 520 and a database 525. While executing on processing unit 510, software module 520 may perform processes for providing paging for converged enterprise private LTE radio service and Wi-Fi access deployments, including for example, any one or more of the stages from method 200 described above with respect to FIG. 2. Computing device 500, for example, may provide an operating environment for WLAN controller 110 and other elements of system 100. WLAN controller 110 and other elements of system 100 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, at a Wireless Local Area Network (WLAN) controller, a notification in response to a User Equipment (UE) device being determined to be in an idle state;
   determining a Citizens Broadband Radio Service (CBRS) Access Point (AP) to page in order to place the UE in a connected state wherein determining the CBRS AP to page comprises:
      determining that the UE is currently associated with a Wi-Fi AP, and
      determining the CBRS AP to be a last CBRS AP the UE was associated with in response to determining that the UE is associated with the Wi-Fi AP; and
   sending a paging request to the determined CBRS AP.

2. The method of claim 1, further comprising:
   receiving, at a Fabric Border (FB) node, a packet destine to the UE; and
   sending a query to a data base for a Routing Locator (RLOC) for the UE based on an identifier of the UE.

3. The method of claim 2, wherein receiving the notification comprises receiving the notification in response to the query indicating a negative acknowledgement.

4. The method of claim 2, wherein the data base comprises a Map Server/Map Resolver (MSMR) database.

5. The method of claim 4, further comprising:
   receiving a response from the CBRS AP indicating that the UE is in the connected state; and
   updating a local cache at the FB node and the database that the UE is in the connected state.

6. A method comprising:
   receiving, at a Wireless Local Area Network (WLAN) controller, a notification in response to a User Equipment (UE) device being determined to be in an idle state;
   determining a plurality of Citizens Broadband Radio Service (CBRS) Access Points (APs) to page in order to place the UE in an connected state;
   sending a paging request to respective ones of the determined plurality of CBRS APs until a service request message is respectively received in response;
   receiving, at a Fabric Border (FB) node, a packet destine for the UE;
   sending a query to a data base for a Routing Locator (RLOC) for the UE based on an identifier of the UE;
   receiving a response from the CBRS AP indicating that the UE is in the connected state; and
   updating a local cache at the FB node and the database that the UE is in the connected state wherein the data base comprises a Map Server/Map Resolver (MSMR) database.

7. The method of claim 6, wherein receiving the notification comprises receiving the notification in response to the query indicating a negative acknowledgement.

8. The method of claim 6, wherein determining the plurality of CBRS AP to page comprises:
   determining that the UE is not currently associated with a Wi-Fi AP; and
   determining the plurality of CBRS APs based on their proximity to a last known Wi-Fi AP that the UE was associated with.

9. The method of claim 6, wherein determining the plurality of CBRS APs to page comprises determining the plurality of CBRS APs to be all the CBRS AP that are known to the WLAN controller.

10. An apparatus comprising:
    a memory; and
    a processing unit coupled to the memory storage, wherein the processing unit is operative to:
       receive a notification in response to a User Equipment (UE) device being determined to be in an idle state, wherein the processing unit being operative to receive the notification comprises the processing unit being operative to receive the notification in response to a query to a data base for a Routing Locator (RLOC) for the UE based on an identifier of the UE indicating a negative acknowledgement;

determine a Citizens Broadband Radio Service (CBRS) Access Point (AP) to page in order to place the UE in a connected state; and send a paging request to the determined CBRS AP.

11. The apparatus of claim 10, wherein the processing unit being operative to determine the CBRS AP to page comprises the processing unit being operative to:

determine that the UE is currently associated with a Wi-Fi AP; and determine the CBRS AP to be a last CBRS AP the UE was associated with in response to determining that the UE is associated with the Wi-Fi AP.

12. The apparatus of claim 10, wherein the processing unit being operative to determine the CBRS AP to page comprises the processing unit being operative to:

determine that the UE is currently associated with a Wi-Fi AP; and determine the CBRS AP based on the CBRS's proximity to the Wi-Fi AP.

13. The apparatus of claim 10, wherein the processing unit being operative to determine the CBRS AP to page comprises the processing unit being operative to determine the CBRS AP based on the CBRS's proximity to a Wi-Fi AP that the UE last associated with.

\* \* \* \* \*